(12) United States Patent
Goldberg

(10) Patent No.: US 8,144,637 B2
(45) Date of Patent: *Mar. 27, 2012

(54) METHOD AND SYSTEM FOR OPTIMIZING POWER RESOURCES IN WIRELESS DEVICES

(75) Inventor: Steven Jeffrey Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1101 days.

This patent is subject to a terminal disclaimer.

(21) Appl. No.: 11/081,294

(22) Filed: Mar. 16, 2005

(65) Prior Publication Data

US 2005/0157667 A1  Jul. 21, 2005

Related U.S. Application Data

(63) Continuation of application No. 10/334,433, filed on Dec. 30, 2002, now Pat. No. 6,950,684.

(60) Provisional application No. 60/377,038, filed on May 1, 2002.

(51) Int. Cl.
 *G08C 17/00* (2006.01)
(52) U.S. Cl. ........ 370/311; 370/312; 370/318; 370/349; 455/574; 455/502; 455/522
(58) Field of Classification Search ............... 455/459, 455/466, 502, 515, 458, 403, 550.1, 68, 522, 455/571, 572, 574; 370/225, 242, 389, 318, 370/311, 312, 324, 349, 350
See application file for complete search history.

(56) References Cited

U.S. PATENT DOCUMENTS

| 4,449,248 A | 5/1984 | Leslie et al. |
| 5,303,379 A | 4/1994 | Khoyi et al. |
| 5,509,015 A | 4/1996 | Tiedemann et al. |
| 5,511,110 A | 4/1996 | Drucker |
| 5,566,357 A | 10/1996 | Holcman |

(Continued)

FOREIGN PATENT DOCUMENTS

EP  0 928 119  7/1999

(Continued)

OTHER PUBLICATIONS

European Telecommunication Standard, "Paging Systems (PS); European Radio Message System (ERMES); Part 4: Air Interface Specification", ETS 300-133-4, European Telecommunications Standards Institute, Jul. 1992, pp. 1-39.

(Continued)

*Primary Examiner* — Jean Gelin
(74) *Attorney, Agent, or Firm* — Volpe and Koenig, P.C.

(57) ABSTRACT

A method and system is disclosed for a device to quickly determine if data is being sent to it. If no data is being sent to the device, the device may return to a sleep mode so as to conserve energy. The present invention includes organizing and transmitting, one at a time, all device destination identifiers. If a message listing search indicates that no message is being sent for a device, the device can continue with any other activity that needs servicing, or if no other activity is pending, it may shut down to conserve power until the next wake up period arrives. If the search returns a positive indication, the count value when the identifier is found can be used to determine the location of the pointer to the message.

11 Claims, 6 Drawing Sheets

U.S. PATENT DOCUMENTS

| | | | |
|---|---|---|---|
| 5,579,372 A | 11/1996 | Astrom | |
| 5,584,048 A | 12/1996 | Wieczorek | |
| 5,590,396 A | 12/1996 | Henry | |
| 5,596,318 A | 1/1997 | Mitchell | |
| 5,625,882 A | 4/1997 | Vook et al. | |
| 5,629,940 A | 5/1997 | Gaskill | |
| 5,822,689 A | 10/1998 | Hwang | |
| 5,857,146 A | 1/1999 | Kido | |
| 5,881,055 A | 3/1999 | Kondo | |
| 5,905,443 A | 5/1999 | Olds et al. | |
| 6,044,069 A * | 3/2000 | Wan | 370/311 |
| 6,097,704 A | 8/2000 | Jackson et al. | |
| 6,144,656 A | 11/2000 | Kinnunen et al. | |
| 6,154,642 A | 11/2000 | Dumont et al. | |
| 6,195,573 B1 | 2/2001 | Cassidy et al. | |
| 6,198,913 B1 | 3/2001 | Sung et al. | |
| 6,215,778 B1 | 4/2001 | Lomp et al. | |
| 6,278,887 B1 | 8/2001 | Son et al. | |
| 6,330,234 B1 | 12/2001 | Tomasi et al. | |
| 6,333,939 B1 | 12/2001 | Butler et al. | |
| 6,335,922 B1 | 1/2002 | Tiedemann, Jr. et al. | |
| 6,366,572 B1 | 4/2002 | Esterberg et al. | |
| 6,438,375 B1 | 8/2002 | Muller | |
| 6,463,307 B1 | 10/2002 | Larsson et al. | |
| 6,477,151 B1 | 11/2002 | Oksala | |
| 6,477,382 B1 * | 11/2002 | Mansfield et al. | 455/458 |
| 6,480,476 B1 | 11/2002 | Willars | |
| 6,480,504 B1 | 11/2002 | Wang et al. | |
| 6,532,220 B1 * | 3/2003 | Carneal et al. | 370/329 |
| 6,594,499 B1 | 7/2003 | Andersson et al. | |
| 6,606,502 B1 | 8/2003 | Chung et al. | |
| 6,622,251 B1 | 9/2003 | Lindskog et al. | |
| 6,636,745 B2 | 10/2003 | Oprescu-Surcobe et al. | |
| 6,650,912 B2 | 11/2003 | Chen et al. | |
| 6,665,520 B2 | 12/2003 | Romans | |
| 6,665,722 B1 * | 12/2003 | Elliott | 709/227 |
| 6,725,068 B2 | 4/2004 | Higuchi | |
| 6,823,191 B2 | 11/2004 | Laroia et al. | |
| 6,879,579 B1 * | 4/2005 | Myles et al. | 370/348 |
| 6,961,571 B1 | 11/2005 | Rune et al. | |
| 2002/0037749 A1 | 3/2002 | Wager | |
| 2002/0090959 A1 | 7/2002 | Laroia et al. | |
| 2002/0090960 A1 | 7/2002 | Laroia et al. | |
| 2002/0187789 A1 | 12/2002 | Diachina et al. | |
| 2003/0002518 A1 | 1/2003 | Shibutani | |
| 2003/0214937 A1 | 11/2003 | Lindoff et al. | |
| 2003/0223394 A1 | 12/2003 | Parantainen et al. | |

FOREIGN PATENT DOCUMENTS

| | | |
|---|---|---|
| EP | 0928119 | 7/1999 |
| EP | 0928119 A | 7/1999 |
| EP | 1 065 626 | 1/2001 |
| JP | 63-199526 | 8/1988 |
| JP | 03-268626 | 11/1991 |
| JP | 05-075528 | 3/1993 |
| JP | 05-114883 | 5/1993 |
| JP | 05-199150 | 8/1993 |
| JP | 05-308317 | 11/1993 |
| JP | 08-033008 | 2/1996 |
| JP | 08-056381 | 2/1996 |
| JP | 2000-261364 | 9/2000 |
| WO | 91/03037 | 3/1991 |
| WO | 95/29568 | 11/1995 |
| WO | 96/11556 | 4/1996 |
| WO | 96/19085 | 6/1996 |
| WO | 97/15154 | 4/1997 |
| WO | 99/21111 | 4/1999 |
| WO | 99/22352 | 5/1999 |
| WO | 00/45281 | 8/2000 |
| WO | 01/22606 | 3/2001 |
| WO | 01/33870 | 5/2001 |
| WO | 01/97538 | 12/2001 |
| WO | 01/97538 A | 12/2001 |
| WO | 02/033989 | 4/2002 |
| WO | 02/33989 | 4/2002 |
| WO | 02/33989 | 5/2002 |

OTHER PUBLICATIONS

European Telecommunication Standard, "Paging Systems (PS); European Radio Message System (ERMES); Part 4: Air Interface specification," Jul. 1992, pp. 1-39.

IEEE Standard for Local and metropolitan area networks, Part 16: Air Interface for Fixed Broadband Wireless Access Systems, IEEE Std. 802. 16-2001 (Apr. 8, 2002).

Sedgewick, "Algorithms in C: Part 5: Graph Algorithms," XP0015377 (2002).

* cited by examiner

METHOD AND SYSTEM FOR OPTIMIZING POWER RESOURCES IN WIRELESS DEVICES

CROSS REFERENCE TO RELATED APPLICATION

This application is a continuation of U.S. patent application Ser. No. 10/334,433 filed on Dec. 30, 2002, which in turn claims priority from U.S. provisional application No. 60/377,038, filed on May 1, 2002, which are incorporated by reference as if fully set forth.

FIELD OF INVENTION

The present invention relates to the field of wireless communications. More specifically, the present invention relates to the optimization of power resources of wireless devices within wireless communications systems.

BACKGROUND

Portable electronic devices frequently run off of batteries. Data delivered to the devices is often short (e.g. email, instant messaging, numerical updates, status changes). The power dissipated by the devices while looking for transmissions that may be directed to them can often exceed the power required to receive such transmissions. Moreover, the devices typically only occasionally have transmissions directed to them. Despite the fact that most devices only occasionally have transmissions directed to them, the devices must nevertheless stay awake for the entire notification period. This means that many devices are dissipating power during the entire notification period, even though usually there is no data for them.

It would therefore be desirable for devices to be able to quickly determine if data is being sent to them, and if not return to a sleep mode so as to conserve energy.

SUMMARY

The present invention is a method and system for optimizing power resources in wireless devices. The invention utilizes message lists adapted to allow devices to quickly determine whether the list contains a message for them thereby decreasing the amount of time devices must be awake while searching for messages.

BRIEF DESCRIPTION OF THE DRAWING(S)

DETAILED DESCRIPTION OF THE PREFERRED EMBODIMENT(S)

Figure 1:
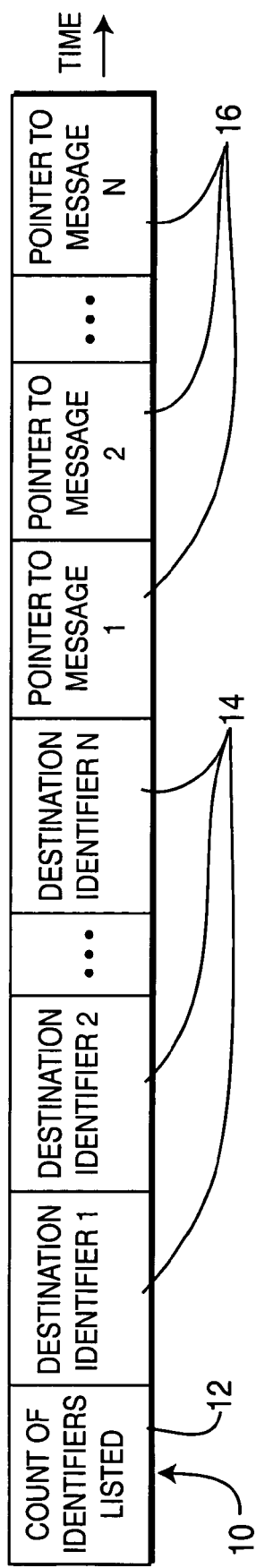
FIG. 1 is a message listing wherein a count of the number of destination identifiers included in the message listing is provided at the beginning of the message listing and further wherein all of the destination identifiers are listed before all the respective pointers in accordance with an embodiment of the present invention.

The preferred embodiments of the present invention will be described with reference to the drawing figures wherein like numerals represent like elements throughout.

Referring initially to FIG. 1, there is shown a message listing 10. Wireless devices are typically synchronized with a network so that the devices know to wake up at predetermined periods and check to see if there are any messages for them. To conserve battery, it is preferable for wireless devices to not only be asleep between the predetermined periods, but also to spend as little time as possible determining whether there is a message for them. Wireless devices typically determine whether they are the intended recipient of a message by checking a message listing. Message listings of the prior art include not only a plurality of identifiers indicative of the destination of each message contained in the listing as well as a count of the number of messages therein, but also the messages themselves. Including the messages themselves in the message listing increases the time which wireless devices must remain awake while determining whether a message listing includes a message for them. For example, where a message listing includes 10 messages listed in increasing order of destination identifiers and there are messages for devices one through four, a wireless device having a device identifier "5" must stay awake for not only the first four message identifiers, but also the first four messages themselves. Once device "5" receives its message it may go back asleep until the next message listing is received, which as mentioned, occurs at predetermined intervals.

Figure 2:
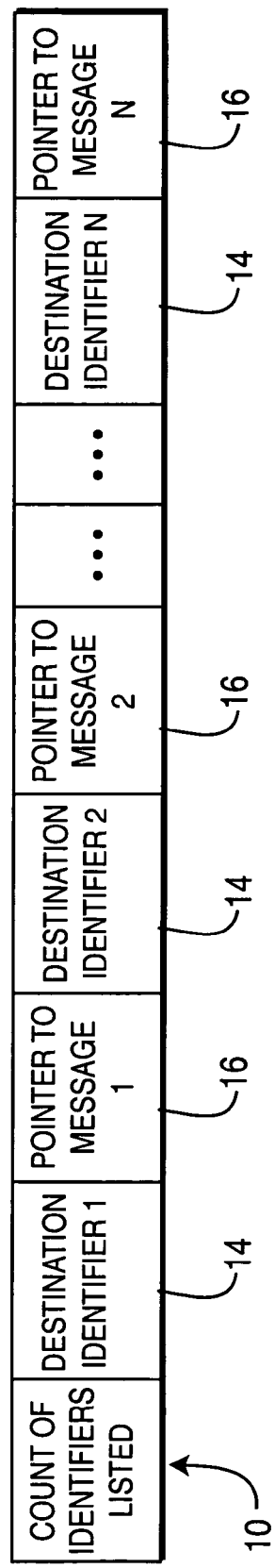
FIG. 2 is a message listing wherein a count of the number of destination identifiers included in the message listing is provided at the beginning of the message listing and further wherein each destination identifier and its associated pointer are listed together in increasing numeric order in accordance with an embodiment of the present invention.
Figure 6:
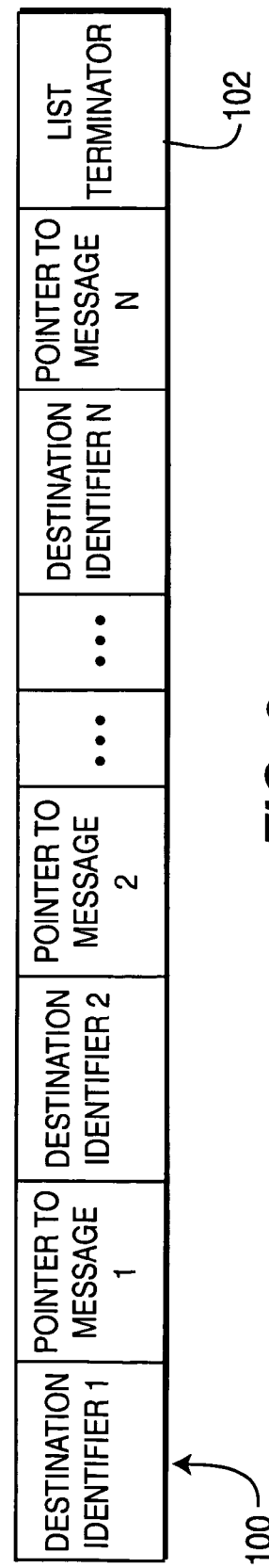
FIG. 6 is a message listing wherein a list terminator is included at the end of the message and further wherein each destination identifier and its associated pointer are listed together in increasing numeric order in accordance with an embodiment of the present invention.

To decrease the time which devices must remain awake while determining whether particular message listings include a message for them, the present invention arranges message listings as shown in FIGS. 1, 2 and 6. Those message listings may be modified as desired/needed to maximize the message determination process without departing from the scope of the present invention.

Referring initially to FIG. 1 a first embodiment of a message listing 10 in accordance with the present invention is shown. The message listing 10 includes a count of the number of destination identifiers included in the message listing and is provided at the beginning of the message listing 10. In this embodiment, the count is indicated with reference numeral 12 and is entitled "count of identifiers listed." The destination identifiers$_{1-N}$, referred to generally with reference numeral 14, are listed in increasing numeric order. Each destination identifier$_{1-N}$ has an associated message pointer. The message pointers$_{1-N}$, in this embodiment, are also listed in increasing numeric order and are generally referred to with reference numeral 16.

In an alternate embodiment, as shown in FIG. 2, the message listing 10 may be configured so that the message pointers$_{1-N}$ 16 follow their associated destination identifiers$_{1-N}$ 14. It should be noted that, in FIGS. 1 and 2, the destination identifiers$_{1-N}$ 14 are organized in increasing monotonic numeric order with their associated message pointers$_{1-N}$ 16, but may also be organized in decreasing monotonic numeric order.

Figure 3:
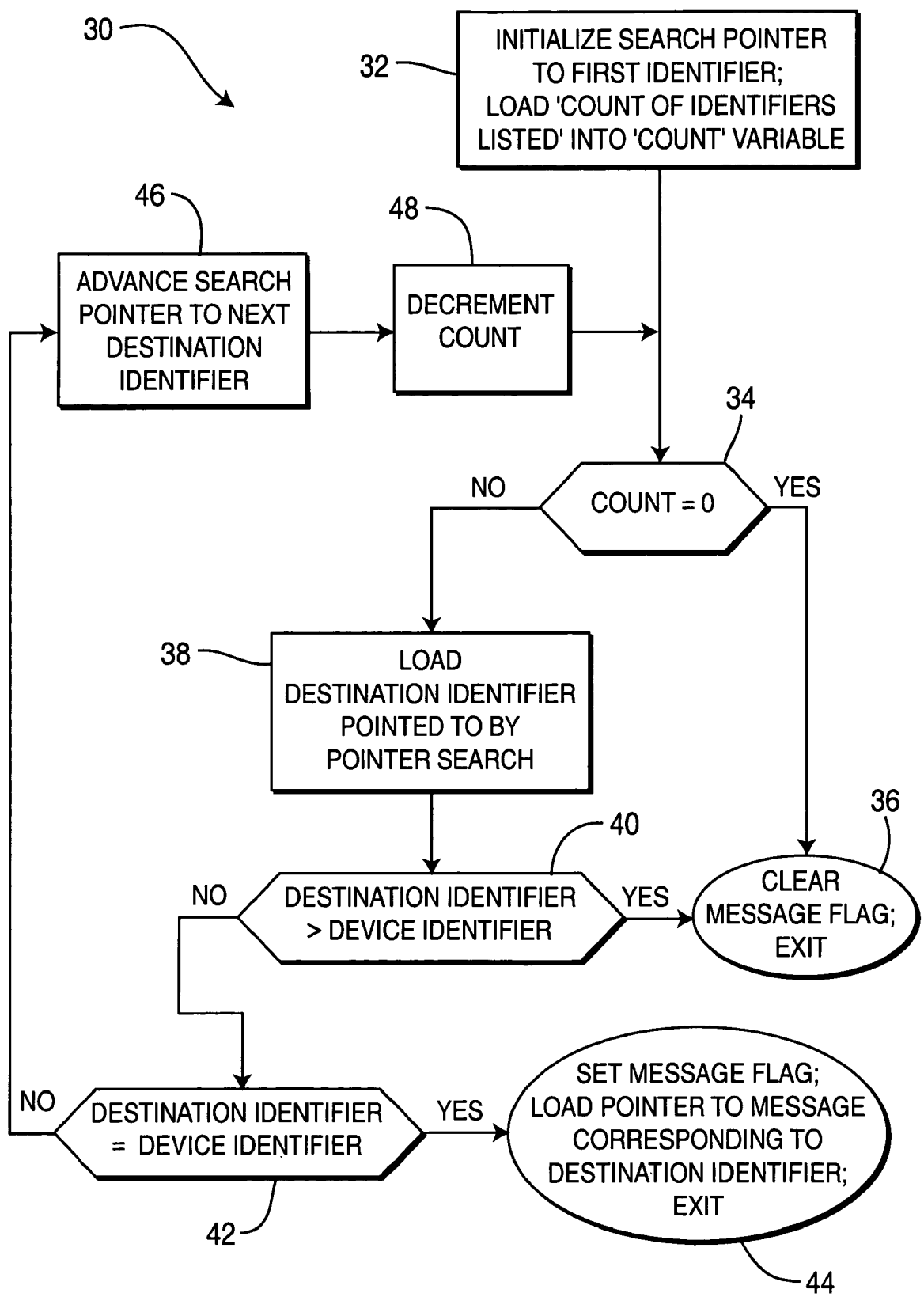
FIG. 3 is a flow diagram showing method steps for devices to determine whether a message listing as shown in either FIG. 1 or FIG. 2 includes any messages for the devices, where the devices are expecting a single message within the message listing, in accordance with an embodiment of the present invention.

A logic diagram showing a method 30 for determining whether a message has arrived for a wireless device is shown in FIG. 3. The wireless device may be any type of wireless device such as, for example, a wireless telephone, a personal digital assistant, or pocket size personal computer. The methods shown in FIGS. 3, 4, and 5 may be applied for both embodiments of message listings shown in FIGS. 1 and 2.

The method 30 begins with step 32 by initializing a search pointer of the device to a first identifier and loading the count of identifiers listed into a count variable (i.e. a register or memory unit that contains the count). The method 30 then proceeds to step 34 to determine whether the count is equal to zero. If the count is equal to zero, the method 30 proceeds to step 36 wherein the message flag is cleared. If the count is not equal to zero, the method proceeds to step 38. In step 38, the destination identifier pointed to by the pointer search is loaded by the device. The device preferably loads the destination identifier into a processing element of the device. Once the destination identifier is loaded by the device, the method 30 proceeds to step 40 wherein the destination identifier is compared with the device identifier to determine whether the destination identifier is greater than the device identifier. If yes, there are no subsequent messages for the device and the method 30 proceeds to step 36 where, as mentioned, the message flag is cleared. If no, the method 30 proceeds to step 42 wherein it is determined whether the destination identifier is equal to the device identifier. If the destination identifier is equal to the device identifier, there is a message for the device and the method 30 proceeds to step 44. In step 44, the message flag is set and a pointer to the message corresponding to the destination identifier is loaded. If the destination identifier is not equal to the device identifier, the method 30 proceeds from step 42 to step 46. In step 46, the search pointer is advanced to the next destination identifier and in step 48 the count is decreased.

Figure 4:
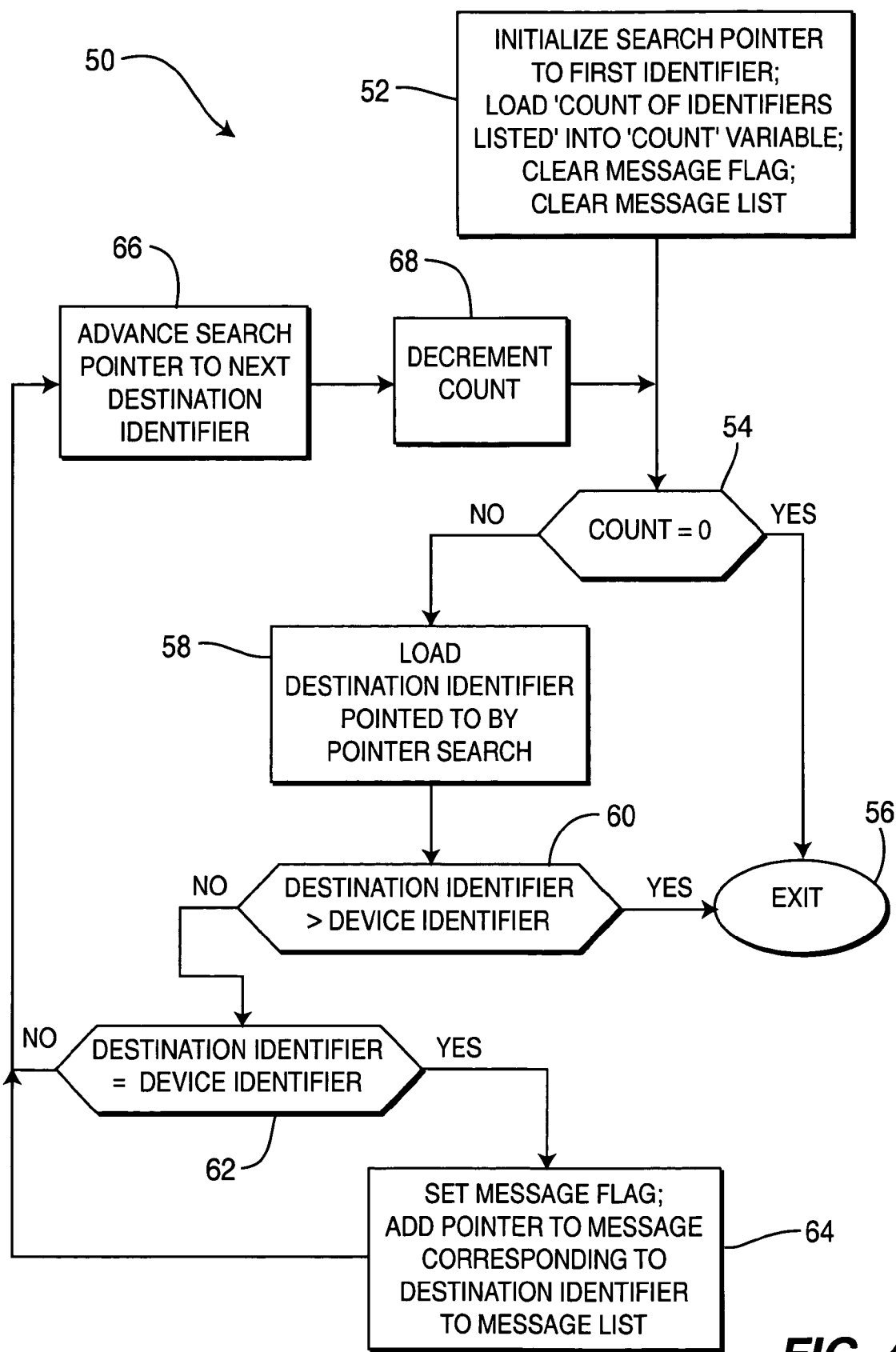
FIG. 4 is a flow diagram showing method steps for devices to determine whether a message listing as shown in either FIG. 1 or FIG. 2 includes any messages for the devices, where the devices are expecting more than one message with the same identifier within the message listing, in accordance with an embodiment of the present invention.

Referring now to FIG. 4, a method 50 for determining whether a message has arrived for a wireless device is shown. In this embodiment the devices are expecting more than one message with the same device identifier within the message listing. The method 50 begins with step 52 wherein a search pointer of a wireless device is initialized to a first identifier, the count of identifiers listed is loaded into a count variable, and the message list and message flag are cleared. From step 52, the method proceeds to step 54 where it is determined whether the count of the identifiers listed is equal to zero. If the count is equal to zero, the method 50 ends at step 56. If the count is not equal to zero, the method 50 proceeds to step 58 wherein the destination identifier pointed to by the search pointer is loaded by the wireless device. From step 58, the method 50 proceeds to step 60 where it is determined whether the destination identifier is greater than the device identifier. If the destination identifier is greater than the device identifier the method 50 proceeds to step 56 where, as mentioned, the method ends. If the destination identifier is not greater than the device identifier, the method 50 proceeds to step 62 where it is determined whether the destination identifier is equal to the device identifier.

In step 62, if the destination identifier is equal to the device identifier, a message flag is set and the pointer to the message corresponding to the destination identifier is added to the message list for the particular wireless device performing method 50 (step 64). From step 64, the method proceeds to step 66 wherein the search pointer is advanced to the next destination identifier. If, in step 62, the destination identifier is not equal to the device identifier, the method 50 proceeds directly from step 62 to step 66. After step 66, the count of identifiers listed is decremented. The amount the count is decremented may be determined as desired.

Figure 5:
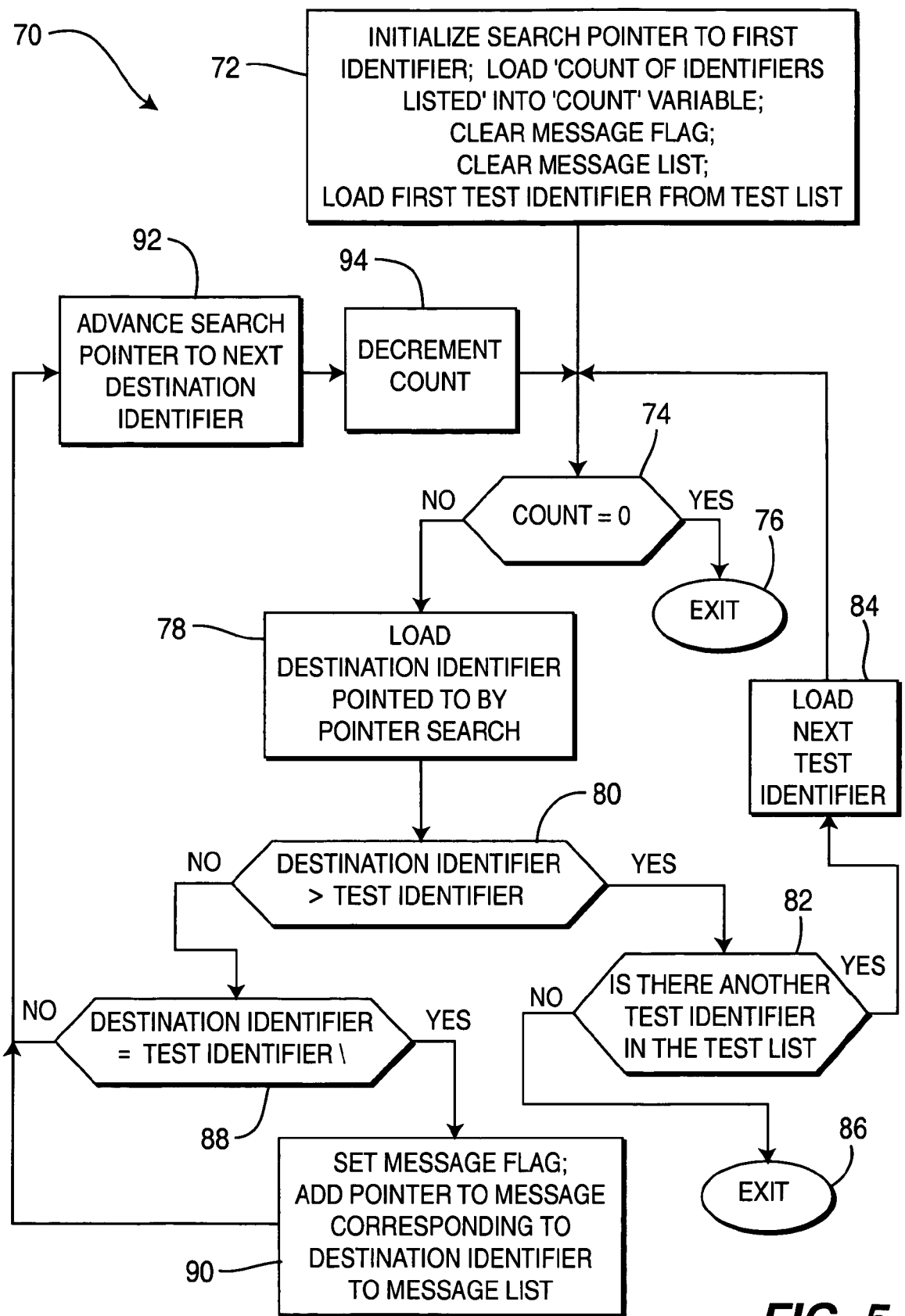
FIG. 5 is a flow diagram showing method steps for devices to determine whether a message listing as shown in either FIG. 1 or FIG. 2 includes any messages for the devices, where the devices are expecting more than one message with the same identifier or multiple identifiers within the message listing, in accordance with an embodiment of the present invention.

Referring now to FIG. 5, a method 70 for determining whether a message has arrived for a wireless device is shown. In this embodiment the devices are expecting more than one message with the same device identifier or multiple identifiers within the message listing. Multiple device identifiers for a single device may be used where the user of a particular device subscribes to several wireless multicast services, for example. By way of explanation, a device may have an identifier for messages specifically meant for the device and it may have another identifier assigned to it associated with a group of devices. In this way the entire group may be sent a message with only a single identifier being sent. A device may also be looking for some transmission broadcasted to an arbitrary number of devices such as, for example, sports game information or stock reports.

The method 70 begins with step 72 wherein a search pointer to the first device identifier is initialized, the count of identifiers listed is loaded into the count variable, the flag and list messages are cleared, and a first test identifier from a test message list is loaded into a processing element of a wireless device. The test message list contains all of the identifiers that the device could potentially be receiving a message from during the time window is awakened to examine. The test list should be in a monotonic order suitable for searching the received identifiers. From step 72, the method 70 proceeds to step 74 where it is determined whether the count of identifiers listed is equal to zero. If yes, the method 70 ends at step 76. If no, the method 70 proceeds to step 78 wherein the destination identifier pointed to by the search pointer is loaded into a processing element of the device. Moving to step 80, it is determined whether the destination identifier is greater than the test identifier. If yes, the method proceeds to step 82 where it is determined whether there is another test identifier in the test list. If there is another test identifier in the list, the next test identifier is loaded in step 84 and the method returns to step 74. If there is not another test identifier, the method 70 ends at step 86.

Returning to step 80, if the destination identifier is not greater than the test identifier, the method 70 proceeds to step 88. In step 88, it is determined whether the destination identifier is equal to the test identifier. If yes, a message flag is set and a pointer to the message corresponding to the destination identifier is added to the message list (step 90). From step 90, the method 70 proceeds to step 92. If, in contrast, the destination identifier is not equal to the test identifier, the method 70 proceeds directly to step 92. In step 92, the search pointer is advanced to the next destination identifier and in step 94 the count of identifiers listed is decremented. The amount the count is decremented may be determined as desired.

Referring now to FIG. 6, there is shown an alternate embodiment of a message listing 100 in accordance with the present invention. In this embodiment there is not a count of the identifiers listed, but rather a list terminator 102 wherein the message listing is terminated by a unique number in the usual identifier position. An efficient value for this terminator in the increasing identifier implementation would be zero. In this way only the pointer needs to be changed during the search, and the comparison for an identifier larger than the one in the listing would terminate the search.

Figure 7:
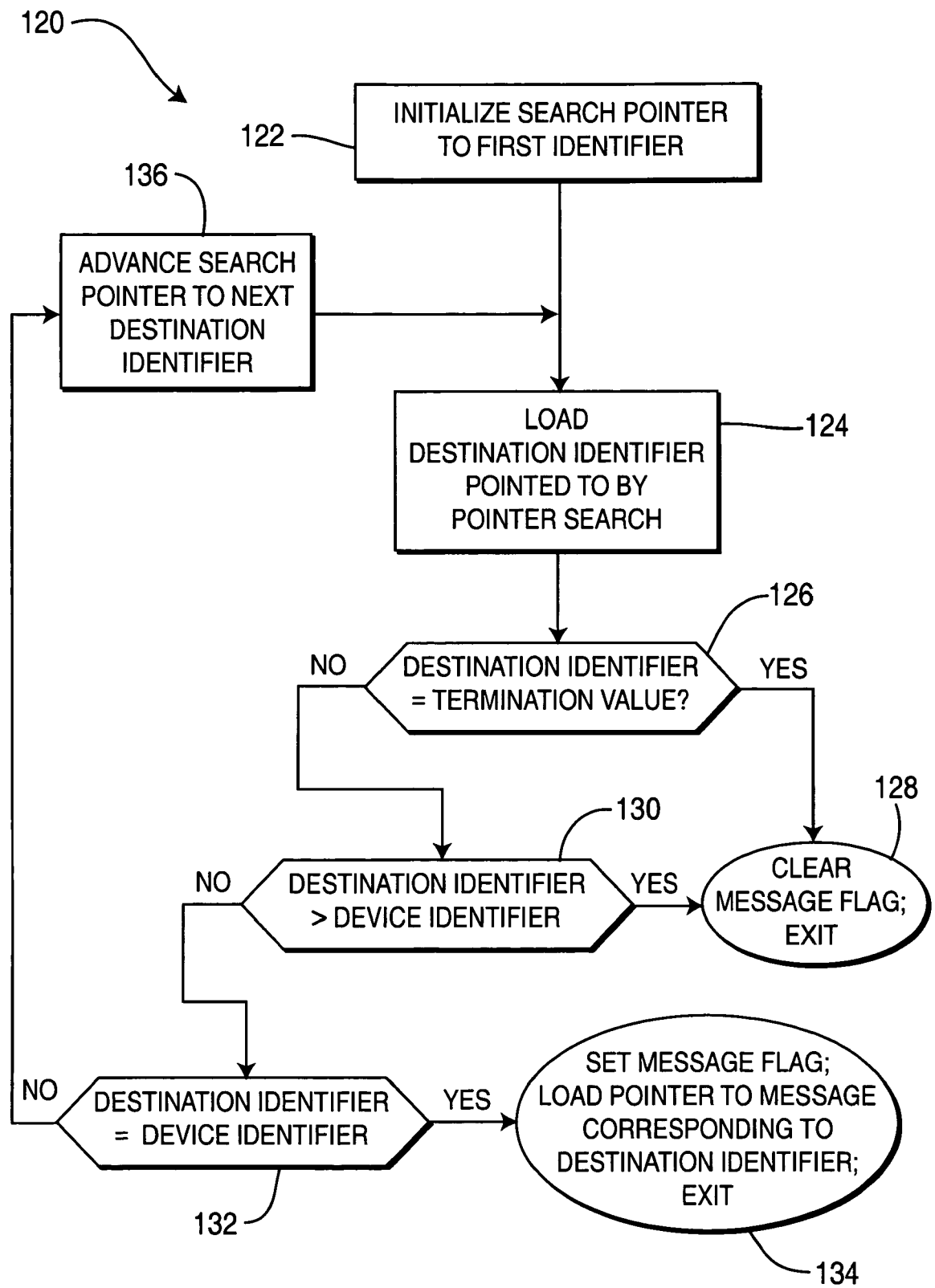
FIG. 7 is a flow diagram showing method steps for devices to determine whether a message listing as shown in either FIG. 6 includes any messages for the devices in accordance with an embodiment of the present invention.

A method whereby devices may determine whether a message listing as shown in FIG. 6 includes any messages for them is shown if FIG. 7. The method 120 begins in step 122 with initializing a search pointer to the first destination identifier. In step 124, the destination identifier pointed to by the search pointer is loaded into a processing element of the device. In step 126, it is determined whether the destination identifier is equal to the termination value (i.e. the value of the list terminator). If the destination identifier is equal to the termination value, the method proceeds to step 128 where the message flag is cleared and the method 120 ends. If the destination identifier is not equal to the termination value, the method 120 proceeds to step 130 where it is determined whether the destination identifier is greater than the device identifier of the particular device that is determining whether a message listing contains a message for it. If the destination identifier is greater than the device identifier, the method 120 proceeds to step 128 where the message flag is cleared and the method 120 ends. If the destination identifier is less than or equal to the device identifier, the method 120 proceeds to step 132.

In step 132, it is determined whether the destination identifier is equal to the device identifier. If so, the message flag is set and the pointer to the message that corresponds to the destination identifier is loaded into a processing element of the device (step 134). If not, the search pointer is advanced to the next destination identifier in step 136 and the method 120 continues at step 124.

Which of the preceding forms is used, or some variation of those presented, is based on efficiency tradeoffs associated with the numerical values allowed for the identifiers and message pointers, and the processing devices searching for messages. The pointer to the message can be a simple programming language pointer to the information defining the existence of the actual message transmission, or it may be the information itself. The actual information may be of the form: carrier channel, time slot, and channelization code. If the message information is very short (e.g. telephone number), it will often be more efficient to insert in the message in the usual position for the message pointer. In this case one or more bits of the message pointer part of the stream will need to be reserved as definition bits for the other bits present. Two bits, for instance, could be encoded such that one encoding indicates the rest of the bits is the message, another encoding that the pointer to the message follows, and a third encoding that the pointer to the data defining where to find the message follows. The fourth encoding possibility is a spare for some future use.

With respect to implementation of the present invention in 3G Radio Access Networks, there are two basic methods for identifying "destinations" and "message pointers." broadcast (BCCH over BCH/P-CCPCH) or dedicated (DCCH over DCH/DPCCH+DPDCH) signaling. If dedicated signaling is applied, the signaling is specific for the "destination," and there is no application or benefit in ordering the control information since all of it is for the destination device. If broadcast signaling is applied, the existing mechanism that retrieves this data is independent of the processing of the data.

When the number of messages is small, the above-described embodiments are usually the fastest means for locating or determining there is not a message for the device. However, if the list is long, there are faster methods which may be implemented to search a monotonically increasing or decreasing message list. For example, binary search protocols on average require $\log_2(\text{Count})$ tests. The calculations are more involved, and different processors will be able to perform them with varying speeds. Typically if there are more than approximately 32 received identifiers, binary searching will be faster for a single identifier being tested. If there are multiple identifiers being tested, sequential testing is more efficient for a larger count. The choice of protocol may also be chosen based on the values of the identifier or identifiers being tested. If a single number is being searched for is low and the receive sequence (i.e. message listing) monotonically increasing, the best approach is to begin the search at the beginning of the received data. If the signal number is high and the receive sequence monotonically increasing, the best approach is to begin the search at the end of the received data. (Data is often transmitted in wireless systems in blocks with interleaving for error correction reasons. All the data of a block therefore needs to be received and decoded before any of it can be examined.) Therefore, a preferred embodiment of the present invention is to take into account the number of received identifiers, whether or not there is one or more identifiers to be looked for, and the numeric distribution of the looked for identifiers in the selection of the search protocol utilized for each search occurrence.

Figure 8:
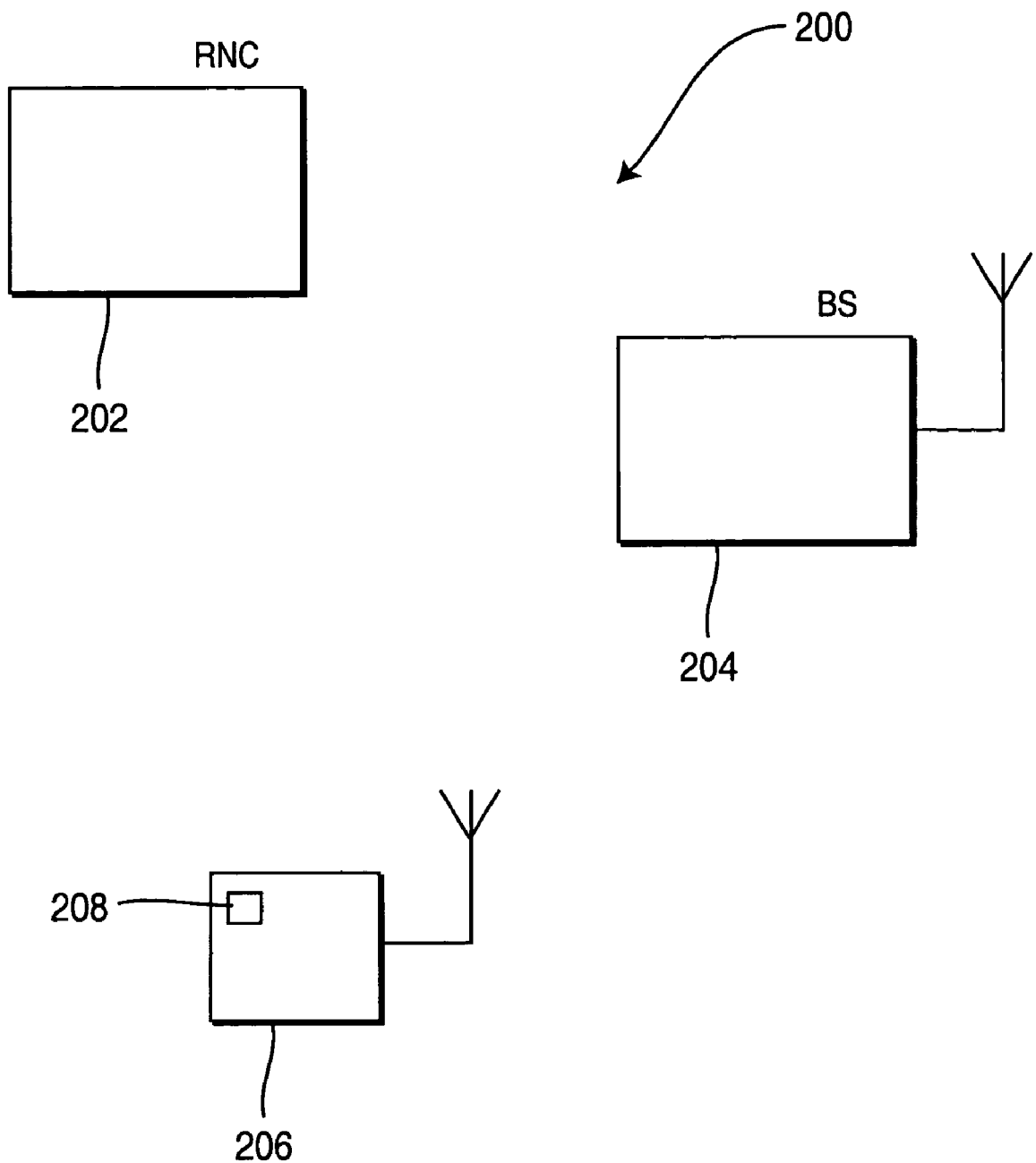
FIG. 8 is a system for optimizing power resources in wireless devices in accordance with an embodiment of the present invention.

Referring now to FIG. 8, there is shown a system 200 for optimizing power resources in wireless devices. The system 200 comprises at least one radio network controller (RNC), at least one base station (BS), and at least one wireless device (206). The wireless device 206 includes a processor 208 for searching message listings for messages wherein the device 206 is the intended recipient. To maximize the amount of time that the device 206 may be asleep (i.e. having only the clock running which will tell the device to periodically wake-up), the message listings are adapted as described above. The device 206 will determine whether a particular message listing includes a message(s) for it using the methods described above according to the type of message listing.

Although particular processing functions have been described as being performed by particular components, it should be understood that performance of processing functions may be distributed among system components as desired.

Although the present invention has been described in detail, it is to be understood that the invention is not limited thereto, and that various changes can be made therein without departing from the spirit and scope of the invention, which is defined by the attached claims.

What is claimed is:

1. A method for use in a wireless device, the method comprising:
   synchronizing with a wireless network such that the wireless device wakes up from a sleep mode during a time interval to receive a message listing;
   receiving the message listing, the message listing comprising a plurality of destination identifiers and a plurality of message pointers, wherein each one of the plurality of message pointers is associated with a destination identifier from the plurality of destination identifiers, wherein each of the plurality of message pointers indicates when a message will be available for reception, and wherein each of the plurality of message pointers points to a different message; and in response to a determination that one of the plurality of destination identifiers corresponds to the wireless device, receiving a message pointed to by a message pointer associated with the destination identifier that corresponds to the wireless device.

2. The method of claim 1 wherein the message listing further comprises a count of destination identifiers in the message listing.

3. The method of claim 1 wherein the message listing further comprises a list terminator.

4. The method of claim 1 further comprising:
returning to sleep mode in response to a determination that none of the plurality of destination identifiers correspond to the wireless device.

5. The method of claim 1 further comprising:
returning to sleep mode until a next time interval.

6. A wireless device wireless device comprising:
a processor configured to analyze a message listing, wherein the message listing comprises a plurality of destination identifiers and a plurality of message pointers, wherein each one of the plurality of message pointers is associated with a destination identifier from the plurality of destination identifiers, wherein each of the plurality of message pointers indicates when a message will be available for reception, and wherein each of the plurality of message pointers points to a different message; and a receiver configured, in response to a determination that one of the plurality of destination identifiers corresponds to the wireless device, to receive a message pointed to by a message pointer associated with the destination identifier that corresponds to the wireless device.

7. The wireless device of claim 6, wherein the processor is further configured to return the wireless device to sleep mode until a next time interval.

8. A method for use in a wireless device, the method comprising:
receiving a message listing via a wireless interface, the message listing comprising a plurality of destination identifiers and a plurality of message pointers, wherein each message pointer is associated with a destination identifier from the plurality of destination identifiers, wherein each message pointer indicates when a message will be available for reception, and wherein each of the plurality of message pointers points to a different message; and in response to a determination that one of the destination identifiers corresponds to the wireless device, receiving a message pointed to by the message pointer associated with the destination identifier that corresponds to the wireless device.

9. The method of claim 8 wherein each message pointer indicates a timeslot during which a message will be available for reception.

10. The method of claim 8 wherein the message listing further comprises a count of destination identifiers in the message listing.

11. The method of claim 8 wherein the message listing further comprises a list terminator.

* * * * *

UNITED STATES PATENT AND TRADEMARK OFFICE
CERTIFICATE OF CORRECTION

| | | |
|---|---|---|
| PATENT NO. | : 8,144,637 B2 | Page 1 of 1 |
| APPLICATION NO. | : 11/081294 | |
| DATED | : March 27, 2012 | |
| INVENTOR(S) | : Steven J. Goldberg | |

It is certified that error appears in the above-identified patent and that said Letters Patent is hereby corrected as shown below:

IN THE SPECIFICATION

At column 3, line 65, after "count is not", delete "is".

At column 5, line 15, after "is shown", delete "if" and insert --in--.

IN THE CLAIMS

At Claim 6, column 7, line 20, after "wireless device", delete "wireless device".

Signed and Sealed this
Twenty-fifth Day of September, 2012

David J. Kappos
*Director of the United States Patent and Trademark Office*